United States Patent [19]

Rashbaum et al.

[11] 3,717,225
[45] Feb. 20, 1973

[54] ANTI-THEFT DEVICE FOR A SHOPPING CART

[75] Inventors: Abraham Rashbaum, Whitestone, N.Y.; Robert Humphrey, Pelham, N.Y.; Peter Consiglio, Lindenhurst, N.Y.

[73] Assignee: by said Humphrey and said Consiglio to said Rashbaum, fractional part interest to each

[22] Filed: Jan. 25, 1971

[21] Appl. No.: 109,128

[52] U.S. Cl. .................188/29, 188/111, 188/167, 280/33.99 C
[51] Int. Cl. ...........................B60t 7/16, B62b 5/04
[58] Field of Search....188/19, 21, 29, 110, 111, 163, 188/167; 280/33.99 C

[56] References Cited

UNITED STATES PATENTS

| | | | |
|---|---|---|---|
| 2,638,183 | 5/1953 | Prowinsky | 188/29 |
| 3,061,049 | 10/1962 | Bramley | 280/33.99 C X |
| 3,090,470 | 5/1963 | Abrams | 280/33.99 C X |
| 3,500,965 | 3/1970 | Nossokoff et al. | 188/29 |
| 3,501,164 | 3/1970 | Peterson | 188/29 X |

Primary Examiner—Duane A. Reger
Attorney—Arthur B. Colvin

[57] ABSTRACT

The invention relates to an anti-theft device to be incorporated into a shopping cart of conventional type which includes a wheel carrying frame generally supporting a basket. The device includes an actuator mounted on the frame, said actuator having a movable piston rod having associated means to exert a force normally urging said piston rod inwardly to retracted position, the piston rod being operatively connected to a pivoted locking bar, the latter having a locking finger normally spaced from at least one of the wheels of the cart when the piston rod is in extended or unlocked position and positively engaging said wheel to restrain rotation thereof when said piston rod is in retracted or locked position, said device including releasable means to retain the piston rod in extended position against the force exerting means, and adjustable control means to vary the rate of movement of the piston rod to retracted locked position.

19 Claims, 14 Drawing Figures

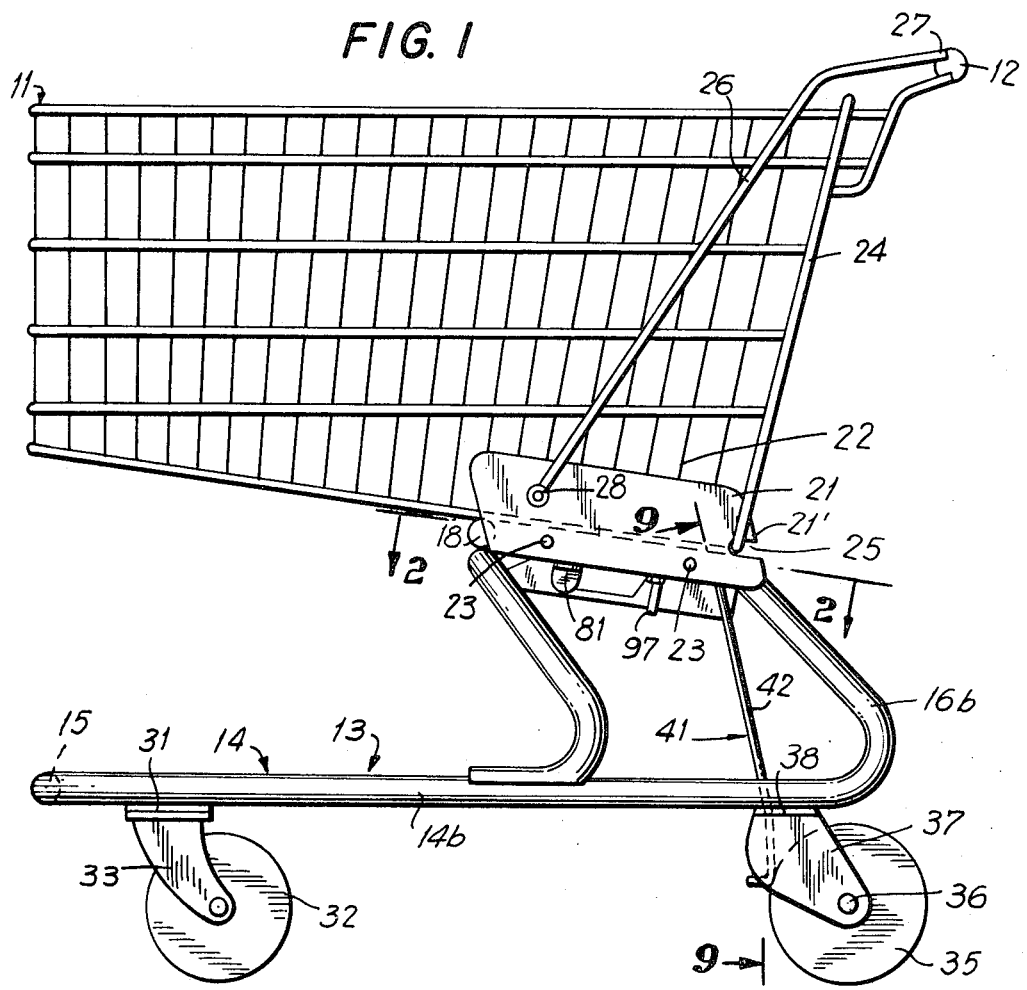
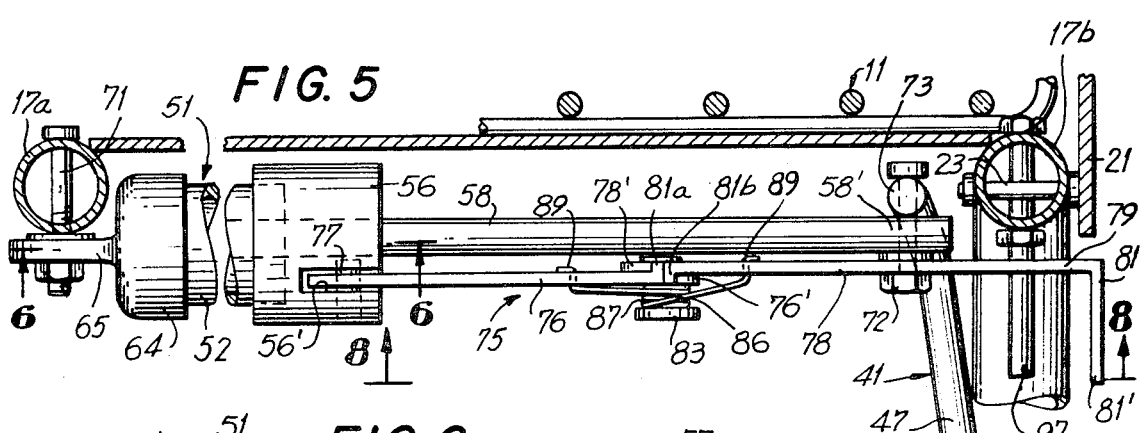
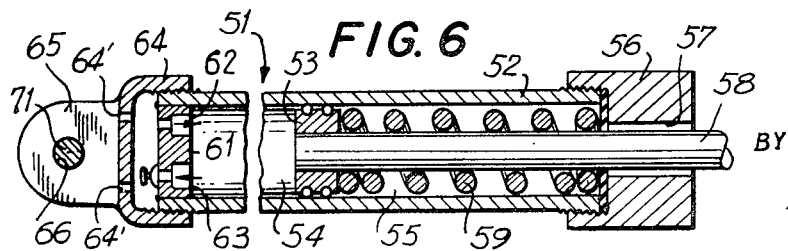

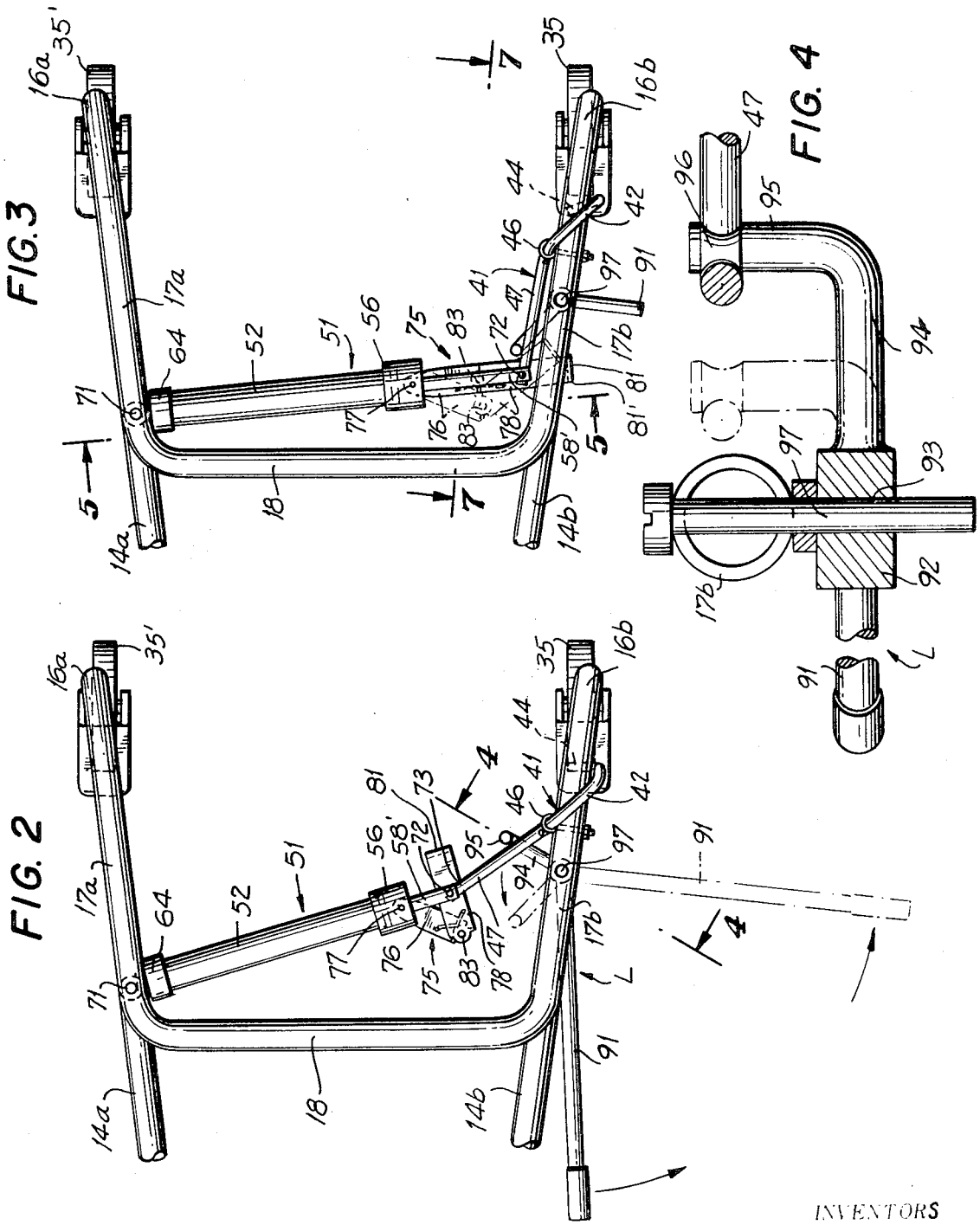

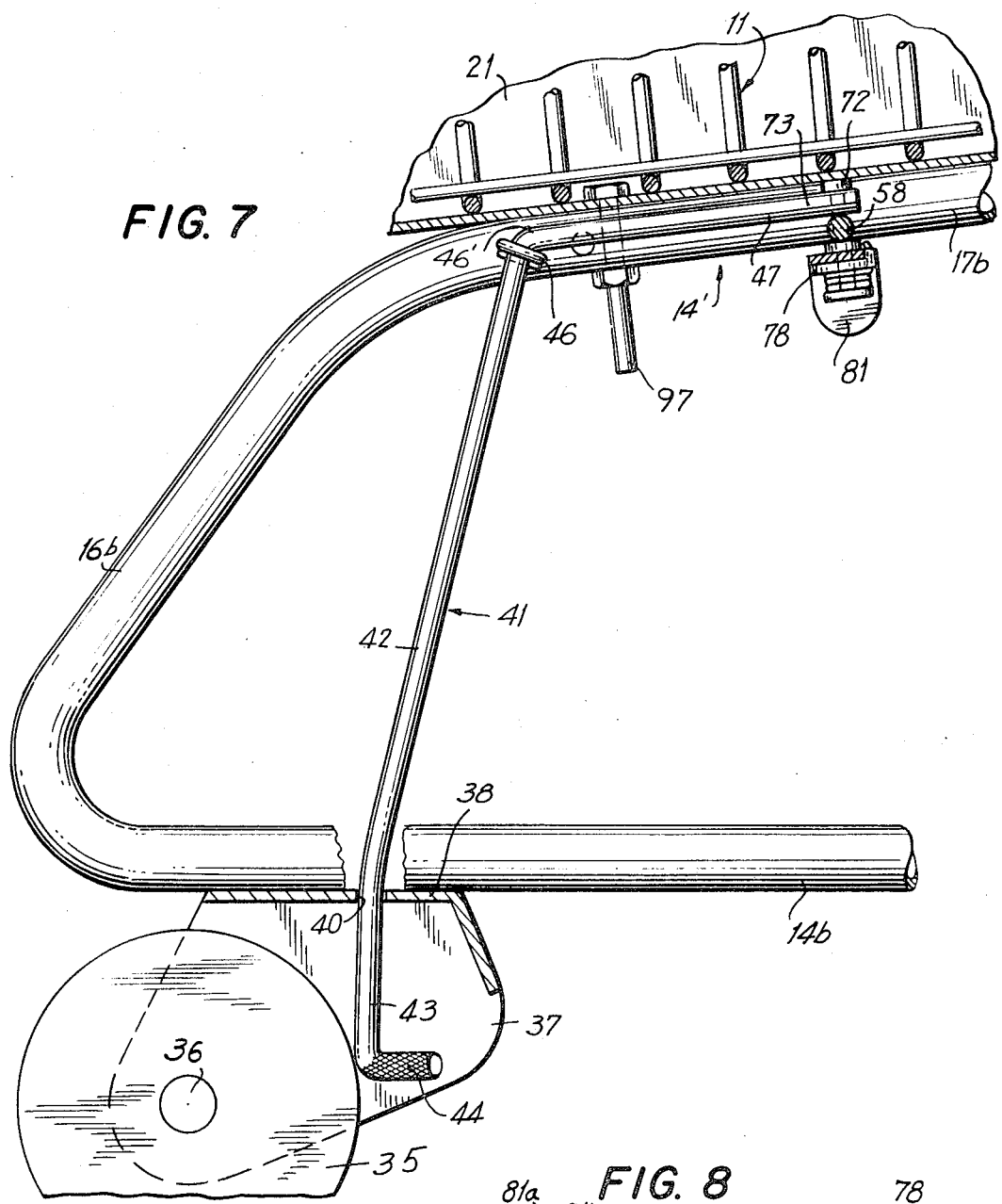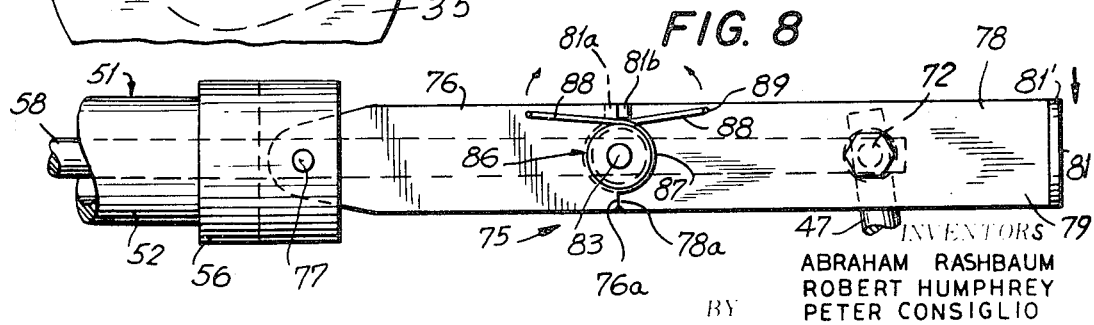

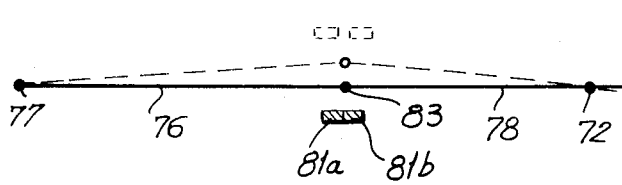
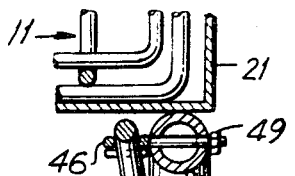
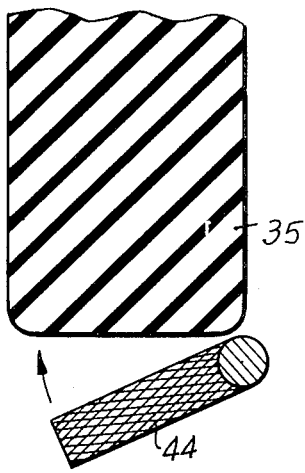
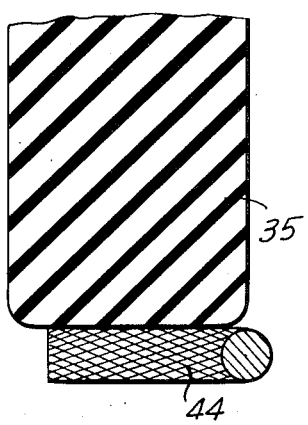
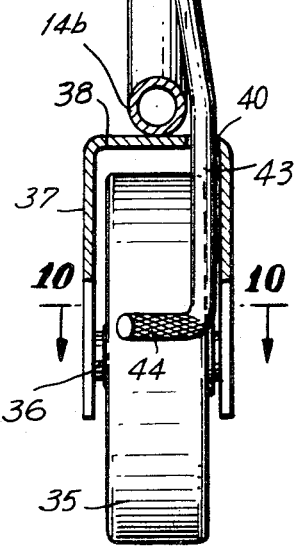
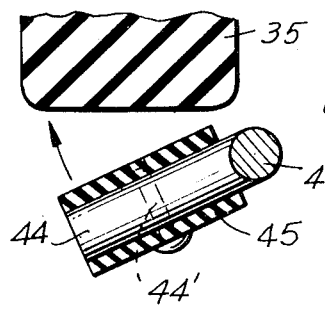
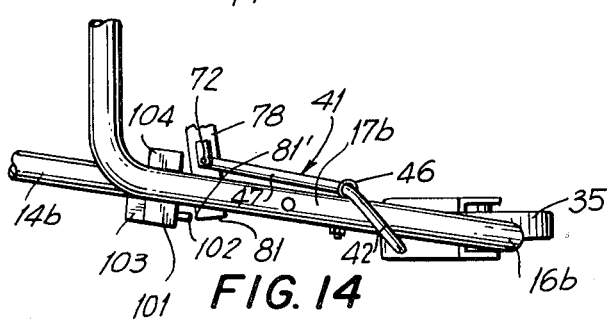
INVENTORS
ABRAHAM RASHBAUM
ROBERT HUMPHREY
PETER CONSIGLIO

ANTI-THEFT DEVICE FOR A SHOPPING CART

As conducive to an understanding of the invention, it is to be noted that shopping carts of the type having a wheel supporting frame which supports a basket, are utilized in large numbers by shoppers in supermarkets and the like.

Since many supermarkets have parking lots associated therewith, it is the general practice for the customer after she has paid her bill for the items purchased, to roll the shopping cart from the supermarket, to her parked car in the parking lot. After the shopping cart is emptied, the customer generally moves it to the side of the car and drives away. Thereafter, an attendant collects the discarded shopping carts and rolls them back to the supermarket.

Unfortunately it has been found that a large number of customers, instead of merely rolling the shopping cart into the parking lot and after emptying the shopping cart, discarding it in usual manner, will roll the shopping cart home. This is particularly true where the customer resides near the supermarket and does not use an automobile.

In addition, it has been found that children will often remove the shopping carts from the vicinity of the supermarket and use them in their games and then discard the shopping carts.

To minimize the loss to the supermarket, resulting from such pilferage of shopping carts, the supermarket owners often employ a truck and attendant to drive around the area and collect all the discarded shopping carts they can find. However, at best only a portion of the pilfered shopping carts are recovered and many of these are damaged and must be repaired with resultant cost to the supermarket owner.

In addition to the type of pilferage above described, there are many cases in which shopping carts are rolled out of the parking lot by organized groups of thieves to an isolated location and then collected and resold.

Apart from the fact that the shopping carts are relatively expensive, costing from 30 to 50 dollars each, the fact that a certain percentage are lost each day makes it necessary for the supermarket owner to keep excess shopping carts on hand in order that the customers may be able to make their purchases. The need for such excess quantity of shopping carts adds an unnecessary overhead to the cost of operation.

Obviously, if some means could be provided to prevent easy removal of the shopping carts from the parking lots, the losses incurred would be greatly reduced.

Where, to accomplish this purpose watchmen are provided, such type of security would be extremely costly. Thus, parking lots are relatively large in size, requiring a large number of watchmen and as supermarkets are generally open until late in the evening, several shifts of watchmen would be required.

Where the shopping carts are equipped with magnetically actuated devices to lock one or more of the wheels of the cart which are activated when the shopping cart is rolled over an electrical cable, the cost of installing such cable is extremely high and in the event of failure of the electrical cable, repair is extremely expensive.

Where the shopping cart is equipped with an anti-theft device which is complex in construction and its cost is a considerable percentage of the cost of the shopping cart itself, it is not economically feasible to install such device in each shopping cart.

It is accordingly among the objects of the invention to provide an anti-theft device which is rugged in construction and capable of withstanding the shock and impact to which the shopping cart is subjected in normal use, which device has but few parts which may readily be fabricated at relatively low cost and which may readily be installed on a conventional shopping cart with but few minor modifications thereof so that the total cost of the installed anti-theft device renders it economical to incorporate in each shopping cart.

Another object is to provide an anti-theft device of the above type which will dependably lock at least one of the wheels of the shopping cart to prevent rotation thereof, after a predetermined and adjustable period of time has elapsed after the shopper has departed from the supermarket and which anti-theft device may readily be reset by an attendant to release the locked wheel to permit normal return of the shopping cart to the supermarket.

Still another object is to provide an anti-theft device of the above type which cannot be reset without use of a special tool which is normally not available to the usual shopper.

According to the invention, the anti-theft device is incorporated into a shopping cart of conventional type which includes a wheel carrying frame generally supporting a basket. The anti-theft device comprises an actuator mounted on the frame. The actuator includes an elongated cylinder having a movable piston rod having associated means such as a coil spring operatively connected thereto to react against the piston rod to urge the latter to retracted position, said coil spring being stressed when the piston rod is moved to extended position. The piston rod is operatively connected to a pivoted locking bar, the latter having a locking finger normally spaced from one of said wheels of the cart when the piston rod is in extended position and positively engaging said wheel to restrain rotation thereof when said piston rod is in retracted position.

The anti-theft device includes releasable means which is automatically set when the piston rod in moved to extended position, to restrain inward movement thereof to retracted position under the urging of said stressed coil spring. In addition, adjustable means are provided to vary the rate of movement of the piston rod to retracted locked position.

In the following drawings in which are shown one or more of various possible embodiments of the several features of the invention, FIG. 1 is a side elevational view of a shopping cart having the anti-theft device incorporated therewith.

FIG. 2 is a fragmentary plan view taken along line 2—2 of FIG. 1 with parts broken away for purposes of clarity, showing the anti-theft device in locked position.

FIG. 3 is a view similar to FIG. 2 showing the anti-theft device in unlocked position.

FIG. 4 is a sectional view taken along line 4—4 of FIG. 2.

FIG. 5 is a detail sectional view taken along line 5—5 of FIG. 3.

FIG. 6 is a longitudinal sectional view taken along line 6—6 of FIG. 5.

FIG. 7 is a sectional view taken along line 7—7 of FIG. 3.

FIG. 8 is a detail plan view of the locking mechanism taken along line 8—8 of FIG. 5.

FIG. 9 is a view taken along line 9—9 of FIG. 1.

FIG. 10 is an enlarged detail view taken along line 10—10 of FIG. 9 showing the wheel in unlocked position.

FIG. 11 is a view similar to FIG. 10 showing the wheel in locked position.

FIG. 12 is a detail view of another embodiment of the locking finger.

FIG. 13 is a diagrammatic view illustrating the operation of the locking mechanism, and FIG. 14 is a detail view of another embodiment of the invention.

Referring now to the drawings, the anti-theft device is incorporated in a shopping cart which is of conventional type and hence will only be described sufficiently for a clear understanding of the invention.

More particularly, as shown in the drawings, the shopping cart illustratively comprises an elongated basket 11, preferably made of steel rods bent to shape and welded in conventional manner. The basket has a conventional bar or handle 12 extending transversely across the rear end thereof, by means of which the shopping cart can be readily moved by the user. The shopping cart includes a wheel assembly 13, which illustratively comprises a length of rigid tubing which has a substantially U-shaped lower base portion 14 with a pair of legs 14a, 14b which, as illustratively shown in FIG. 2, diverge outwardly slightly from the transverse cross piece 15 at the front of the base 14. The free ends of the legs 14a, 14b at the rear of the base 14 are curved upwardly and inwardly as at 16a, 16b and the upper ends of the inclined legs 16a, 16b are extended forwardly as at 17a, 17b above an associated leg 14a, 14b, being connected by the cross piece 18 of the upper base portion 14' defined by said legs 17a, 17b.

In order to mount the basket 11 on the wheel assembly 13, a pair of plates 21 is provided, straddling the lower portion of the basket 11 adjacent the rear 22 thereof. Each of the plates is rigidly secured as by bolts 23 to the associated leg 17a, 17b of the upper base portion 14'. The rear of the basket 11 has a U-shaped reinforcing frame 24 welded thereto and each of the plates 21 adjacent its rear edge 21' has a notch 25 through which the reinforcing frame extends. A pair of locking bars 26 are secured at one end as by welding to the ends of the handle 12 at 27 and the other end of the bars 26 are secured as by bolts 28 to the associated plate 21.

Extending transversely across the legs 14a, 14b adjacent the cross piece 15 is the front wheels support bar 31 secured as by welding at its ends to said legs 14a, 14b. The bar 31 mounts in conventional manner, a pair of caster wheels 32 which define the front wheels of the shopping cart and each of which is rotatably mounted in a yoke 33 that itself can rotate through an angle of 360° on its pivotal mount to the support bar 31. A second pair of wheels 35, 35' is provided, which define the rear wheels of the shopping cart and each of which is rotatably mounted as at 36 between the legs of a U-shaped yoke 37, the cross piece 38 of which is welded to an associated leg 14, 14b adjacent the rear ends thereof.

Thus, the wheels 35 may rotate about their axis 36 but the support for the wheels is rigidly secured, unlike the support for the wheels 32, which may itself rotate through an angle of 360°.

The construction of the shopping cart thus far described is conventional and per se, forms no part of the present invention. According to the invention, the anti-theft device comprises a locking rod 41, clearly shown in FIGS. 1 and 7 for example. The locking rod has a body portion 42 which extends substantially vertically, the lower portion 43 of which extends through an opening 40 in the cross piece 38 of the yoke 37 supporting rear wheel 35, as shown in FIGS. 7 and 9. The extremity of end portion 43 is bent at right angles to form a locking finger 44 which illustratively is knurled as shown or it may mount a rubber sleeve 45 (FIG. 12) detachably secured to the locking finger 44 as by rivet 44' to compensate for wear of the caster wheel 35 with which it coacts in the manner hereinafter to be described.

The upper end of the body portion 42 extends through a collar 46 and is then bent as at 46' (FIG. 7) at an angle of slightly greater than 90° with respect to body portion 42 to define the actuating arm 47 of the locking rod 41. The collar 46 which defines the pivot for the locking rod 41, is secured in any suitable manner to the leg 17b and illustratively the collar has a threaded stud (FIG. 9) welded at one end thereto, the stud extending through the bar 17b and having a locking nut 49 secured to the protruding end thereof.

In order to apply force to the actuating arm 47 to rotate rod 41 to move finger 44 against wheel 35 to lock the latter, an actuating device 51 is provided. This actuating device may be of the type manufactured by Ideal Security Hardware Corporation of St. Paul, Minnesota, but any suitable actuating device of the type required may be provided.

Thus, as illustratively shown in FIG. 6, the actuating device 51 may comprise an elongated rigid cylinder 52 of steel or similar metal, which has a piston 53 slidably mounted therein and defining two chambers 54, 55 in the cylinder. The piston 53 may have suitable annular seals around its periphery substantially to prevent leakage of air from chamber 55 to chamber 54. The end of cylinder 52 which forms the outer end of chamber 55 is closed by a threaded cap 56 which has an axial opening 57 through which a piston rod 58 extends, the inner end of the piston rod being secured to the piston 53. A heavy duty coil spring 59 positioned in chamber 55, encompasses the portion of the piston rod 58 in said chamber, said spring reacting against the piston 53 and the cap 57 normally to urge the piston 53 inwardly to retract the piston rod 58.

The end of cylinder 52 defining the outer end of chamber 54 has a plate 61 secured therein as by welding, said plate illustratively having a pair of valves of conventional type mounted therein, one of said valves 62 being a one-way valve which permits flow of air in direction only into the chamber 54 and the other valve 63 being an adjustable valve which permits flow of air in direction only out of the chamber 54 at a predetermined rate which may be set as desired. A mounting cap 64 is screwed over the end of the cylinder 52, said mounting cap having a plurality of vent holes 64' therein and also having an outstanding finger 65 with a mounting hole 66 therethrough.

The actuating cylinder 51 is pivotally mounted to the upper leg 17a adjacent the cross piece 18 thereof, as by a bolt 71 extending through the mounting hole 66 in the finger 65'.

The outer end 58' of the piston rod 58 of the actuator 51 is pivotally connected as by a bolt 72 to the end 73 of the actuating arm 47 of rod 41 so that the inward and outward movement of the piston rod 58 will be transmitted to the actuating arm 47 in the manner to be described, causing the latter to rotate the body portion 42 of the locking rod 41 in its pivot mount 46 thereby causing the locking finger 44 of rod 41 to move into and out of engagement with the caster wheel 35.

Means are provided to retain said piston rod 58 in extended position against the tension exerted by coil spring 59, which will cause the body portion 42 of rod 41 to be retained in a position in which the locking finger 44 will be spaced from the caster wheel 35 as shown in FIGS. 3, 7 and 10 to permit free rotation of the latter.

To this end, a linkage 75 (FIGS. 3, 5, 7 and 8) is provided, comprising a first link 76 pivotally mounted at one end as at 77 to the cap 56 in a slot 56' provided therein, and a second link 78 pivotally mounted between its ends on the pin or bolt 72, by means of which the piston rod 58 and actuating arm 47 are pivotally connected.

The free end of the portion 79 of link 78 extending beyond pivot 72 is downwardly bent as at 81 to define a trip finger, the function of which will be hereinafter described.

Each of the inner ends of links 76 and 78 has a protruding tongue 76', 78', the latter overlapping the former as shown in FIG. 5 and each of the tongues has an opening therethrough which are aligned to receive a bolt or pin 83, pivotally to connect the inner ends of the links together.

It is to be noted that the pivotal mount 77 and 72 for the links 76, 78 are always longitudinally aligned with the piston rod 58 in all positions of the links, since they are secured respectively to the cap 56 and piston rod 58. When the piston rod is fully extended, as shown in FIGS. 5 and 8, which extension is determined by the full extension of the two links 76, 78, at such time, according to the invention, it is desired that the piston rod 58 be restrained from retraction under the urging of the coil spring 59, which is stressed as well be hereinafter described. For this purpose the adjacent inner ends 76a, 78a of the links 76, 78 have abutments 81a, 81b near one edge illustratively formed by offsetting upwardly and downwardly respectively a portion of said inner ends 76a, 78a to form lips extending at right angles to the body of each of the links.

As shown in FIGS. 5 and 8, a relatively light coil spring 86 has its convolutions 87 encompassing the bolt 83 with the outwardly extending legs 88 of the spring being secured as at 89 to the links 76, 78 thereby tending to urge the links 76, 78 in a clockwise and counterclockwise direction respectively with respect to pivot 83 (with reference to FIG. 8).

The abutments are so formed, that when the pivot 83 is longitudinally aligned with pivots 77 and 72, the abutments will be in engagement as shown in FIGS. 8 and 13.

It is apparent that the force of the tensed coil spring 59 will attempt to retract the piston rod 58 inwardly. With reference to FIG. 8, it is further apparent that since the pivot point 72 is connected to piston rod 58 and to link 78, with the latter being pivotally connected to link 76 at 83 and with link 76 pivoted to cap 56 at 77, in order for the piston rod to retract, the linkage 76, 78 must fold about the pivot 83.

With the pivots 77, 83, 72 longitudinally aligned, it is apparent there is no lever arm with respect to pivot 83 so that the force of spring 59 is only in a longitudinal direction and hence no folding action would occur.

In practice, there must be some clearance at the pivots 77, 83, 72 to permit pivotal movement of the links and it would be impossible in view of the tolerances that must be provided to have exact longitudinal alignment.

Since the engaging abutments 81a, 81b prevent upward folding movement of the links 76, 78 about pivot 83 (referring to FIG. 8) the links could only fold downwardly. However, when the links have been fully extended as shown in FIG. 8, with pivots 77, 83, 72 in longitudinal alignment, since as above noted, there is no lever arm with respect to pivot 83 there would be substantially no force exerted by coil spring 59 that would tend to fold the links downwardly about pivot 83.

Consequently, the relatively light coil spring 87 will be exerting the only effective force to fold the links 76, 78 and thus force will be exerted to fold the links upwardly about pivot 83 thereby retaining the abutments in engagement to prevent folding of the links. Consequently, although the tensed coil spring 59 is reacting against piston rod 58 to retract the latter, the linkage 76, 78 will lock the piston rod 58 in its fully extended position.

Since the coil spring 86 exerts relatively little force as compared to that exerted by the heavy duty coil spring 59, the spring 86 has no effect on limiting the action of spring 59 in retracting the piston rod 58 in the manner to be hereinafter described.

Means are provided to extend the piston rod 58 from its retracted to its extended position, thereby causing the locking finger 44 to be pivoted away from the caster wheel 35 for normal free rotation thereof. Due to the force exerted by the compressed heavy duty spring 59, it would be extremely difficult, if not impossible to extend the piston rod 58 by pulling directly thereon. If force was applied against the trip finger 81 when in the position shown in FIG. 2, in direction to attempt to extend the piston rod 58, due to the relatively short distance between the pivot point 72 attached to the piston rod 58 and the trip finger 81, the resultant lever multiplication would be extremely small and hence it would be almost impossible for the average person to exert sufficient force on the trip finger 81 to extend the piston rod.

According to the invention, a separate lever device is provided which normally is only available to the attendant who collects the carts in the parking ares.

As shown in FIGS. 2 and 4, the lever device L comprises an elongated bar 91 to one end of which is secured a hub 92 which has a pivot opening 93 therethrough. The hub also has secured thereto, one end of an actuating arm 94 which extends outwardly from the hub 92 forming an angle of slightly greater than 90° with respect to the bar 91. The free end of the actuating arm 94 has an upstanding finger 95 formed integral therewith, which illustratively has an annular groove 96 at its free end.

The leg 17b adjacent the collar 46 mounts a depending pivot stud 97 (FIGS. 5, 7). To extend the piston rod 58 thereby moving it from the locking position shown in FIG. 2 to released position shown in FIG. 3; the hub 92 is mounted on the pivot stud 97 with the depending finger 95 positioned inwardly of actuating arm 47 and with the bar 91 as shown in FIG. 2 extending substantially parallel to leg 17b. The attendant then moves the bar 91 in a counterclockwise direction to the position shown in broken lines in FIG. 2 and in full lines in FIG. 3.

As a result of such movement of bar 91, the grooved end of finger 95 will engage actuating arm 47 and move it from the position shown in FIG. 2 to the position shown in FIG. 3.

By reason of the length of the bar 91, the resultant multiplication of forces will make it relatively simple to extend the piston rod 58 and stress or compress the heavy duty spring 59.

As a result of the movement of actuating arm 47, the rod 41 will rotate so that locking finger 44 will be spaced from wheel 35 to permit free rotation thereof.

As previously described, when the piston rod 58 is extended sufficiently to move the central pivot 83 into longitudinal alignment with the outer pivots; the coil spring 86 will act to retain the abutments 81a, 81b in engagement to prevent folding of the links 76, 78 under the force exerted by the stressed coil spring 59. Hence the piston rod 58 will remain locked in extended position with the locking finger 44 spaced from wheel 35.

With the piston rod 58 extended and the abutments 81a, 81b engaging, the locking mechanism will be in ready position to be triggered to effect the anti-theft operation. In the ready position, as above noted, the locking finger 44 will be spaced from the caster wheel 35 and the trip finger 81 as shown in FIGS. 7, 8 will be adjacent the side rod 17b, readily available for access to the cashier or other attendant who is to trigger the device. Such triggering action is readily accomplished by the attendant merely pressing against the edge 81' of the trip finger, (FIG. 3).

By reason of the fact that only a relatively slight force is exerted by the coil spring 86 to maintain abutments 81a, 81b engagement with the pivot 83 aligned with pivots 77, 72, consequently only a slight force need be exerted against trip finger 81 to overcome the force of spring 86 thereby causing the link 78 (FIG. 8) to rotate on pivot 72 to move pivot 83 upwardly (FIG. 8) or to the left (broken line position shown in FIG. 3) of the longitudinal line between pivots 72, 77.

At such time since the locking action caused by the engagement of abutments 81a, 81b of links 76, 78 will be released, the tensed coil spring 59 will move the piston rod 58 inwardly thereby retracting the pivot point 72.

Referring to FIGS. 3 and 6, when the linkage 76, 78 is released as above described, the force of the tensed coil spring 59 reacting against piston 53 will move the latter to the left thereby retracting the piston rod 58. As the air in chamber 54 cannot flow outwardly through valve 62, it will discharge through valve 63 and the rate of flow will be determined by the setting of such valve which will control the speed of movement of piston 53 and hence the rate of retraction of piston rod 58.

As the piston rod 58 retracts, referring to FIG. 2, it will exert force on actuating arm 47, thereby pivoting actuating rod 41 from the position shown in FIG. 3 to the position shown in FIG. 2. Thus, the locking finger 44 will be moved from the position shown in FIGS. 3, 7 and 10 in which it is spaced from wheel 35 to the position shown in FIGS. 2 and 11 in which it presses tightly against wheel 35 under the force exerted by the still stressed coil spring 59 to lock the wheel 35 and restrain rotation thereof. As a result, it would be relatively difficult for the usual shopper to roll the shopping cart.

The valve 63 is set to permit a sufficient period of time to elapse before the finger 44 will engage the wheel 35 to permit the shopper to roll the shopping cart to her automobile in the parking lot.

The period of time which elapses before the wheel 35 is locked is not sufficient to permit the shopper to roll the cart out of the parking lot. Hence, if the shopper should attempt to remove the shopping cart from the lot before she can leave the lot, the wheel 35 would have locked to prevent further ready movement of the shopping cart so that the shopper would then have to remove her packages from the shopping cart and leave the shopping cart in the lot.

According to usual practice, an attendant normally collects the numerous shopping carts left in the parking area and rolls them back to the supermarket for re-use.

The attendant who collects the shopping carts will folow the same procedure with respect to the shopping carts equipped with the anti-theft device of the present invention, but such attendent would carry with him the unlocking lever L which he will utilize in the manner previously described to unlock the wheel 35 so that the attendant will be readily able to roll the shopping carts back to the supermarket.

It is within the scope of the invention to have an automatic actuation of the trip finger 81 rather than the manual actuation by the cashier, previously described. This may be accomplished for example, as shown in FIG. 14 by having a solenoid 101 mounted on leg 17b with the plunger 102 of the solenoid when in the retracted position shown, slightly spaced from the edge 81' of the trip finger 81.

The solenoid may be actuated by a radio receiver 103 of the miniature type also mounted on leg 17b, the energy for energizing the solenoid 101 to extend its plunger 102, being supplied by a battery 104.

Thus, when the customer has paid her bill and is moving the shopping cart through the exit of the supermarket to the parking lot, a transmitter located at such exit will actuate the receiver 103 which in turn will energize the solenoid 101 to cause the piston rod 102 thereof to be extended to react against the edge 81' of the trip finger 81 to permit release of the linkage 76, 78 thereby permitting retraction of the piston rod 58 in the manner previously described.

Although the relatively simple mechanical construction previously described is preferred as it is much less costly in price and does not require any electrical components, under certain conditions automatic actuation may be desired and such automatic actuation is within the scope of the present invention.

Having thus described our invention, what we claim as new and desired to secure by Letters Patent of the United States is:

1. An anti-theft device for a cart of the type comprising a support frame having a plurality of wheels mounted thereon, said anti-theft device comprising an actuator mounted at one end on said frame, said actuator having a piston rod, resilient means operatively connected to said piston rod and stressed when said piston rod is in extended position normally urging said piston rod to retracted position, a pivotally mounted locking bar operatively connected to said piston rod to be actuated by movement of the latter, said locking bar having a locking finger normally spaced from one of said wheels when said piston rod is in extended position and engaging said wheel to restrain rotation thereof when said piston rod is in retracted position, and means releasably to lock said piston rod in extended position against the urging of said stressed resilient means, whereby upon release of said locking means, said stressed resilient means will move said piston rod to retracted position thereby to cause said locking finger to engage said wheel.

2. The anti-theft device of claim 1 in which said actuator is pivotally mounted at one end to said frame and said piston rod extends from the other end of said actuator.

3. The anti-theft device of claim 1 in which means are provided to control the rate of movement of said piston rod from extended to retracted position.

4. The anti-theft device of claim 1 in which adjustable means are provided to control the rate of movement of said piston rod from extended to retracted position.

5. The anti-theft device of claim 1 in which said actuator comprises a cylinder pivotally mounted at one end to said frame, said cylinder having a piston slidably mounted therein, said piston rod being secured at one end to said piston and protruding from the other end of said cylinder and a heavy duty coil spring is positioned in said cylinder between the piston and said other end of the cylinder, said coil spring defining said resilient means.

6. The anti-theft device of claim 1 in which said actuator comprises a cylinder pivotally mounted at one end to said frame, a cap secured to the other end of said cylinder, a piston slidably mounted in said cylinder, said piston rod being secured at one end to said piston and protruding axially through said cap, a heavy duty coil spring positioned in said cylinder between said piston and said cap, said coil spring defining said resilient means, the means releasably to lock said piston rod in extended position comprises a pair of links having one of their ends pivotally connected together on a central pivot, the other ends of said links being respectively pivotally connected to the cap and to the free end of the piston rod, the axes of said pivots being at right angles to the longitudinal axis of said piston rod, said three pivots when said piston rod is in extended position being substantially longitudinally aligned, whereby the moment of force tending to fold said links about said central pivot under the urging of said stressed resilient means will be substantially zero.

7. The combination set forth in claim 6 in which said cap has a slot therein, one end of one of said links is positioned in said slot and a pivot pin extends through said slot and the end of the link therein pivotally to mount said link.

8. The anti-theft device of claim 1 in which the means releasably to lock said piston rod in extended position comprises a pair of links having one of their ends pivotally connected together on a central pivot, the other ends of said links being respectively pivotally connected to the free end of said piston rod and to the end of said cylinder from which the piston rod protrudes, the axes of said pivots being at right angles to the longitudinal axis of said piston rod, said three pivots, when said piston rod is in extended position being substantially longitudinally aligned, whereby the moment of force tending to fold said links about said central pivot under the urging of said stressed resilient means, will be substantially zero.

9. The combination set forth in claim 8 in which said links are positioned in a plane parallel to and vertically displaced from the plane of said piston rod, the ends of said links which are pivotally connected together, having overlapping portions and each of said ends has an abutment, said abutments engaging when said links are substantially longitudinally aligned, whereby said links when longitudinally aligned can fold about said central pivot only in direction to move said abutments away from each other.

10. The combination set forth in claim 8 in which the ends of said links which are pivotally connected together have overlapping portions, each of said ends has an abutment, said abutments engaging when said links are substantially longitudinally aligned, whereby said links when longitudinally aligned can fold about said central pivot only in direction to move said abutments away from each other, resilient means associated with said central pivot and reacting against said links, normally to fold said links in direction to move said abutments toward each other, said central resilient means exerting a relatively small force as compared to the force exerted by the first resilient means, whereby when said links are longitudinally aligned and the moment of force exerted by the first resilient means is substantially zero, the central resilient means will retain said abutments in engagement to prevent folding of said links and retraction of the piston rod.

11. The combination set forth in claim 10 in which said central resilient means comprises a spring having a coil portion encompassing said central pivot with the ends of said coil portion extending outwardly therefrom and being secured respectively to said links on opposed sides of said central pivot.

12. The combination set forth in claim 10 in which means are provided to move said central pivot out of longitudinal alignment with said two other pivots thereby unlocking said piston rod, whereby the movement of force to fold said links about said central pivot under the urging of said first resilient means will overcome the relatively small force exerted by the central resilient means to permit retraction of said piston by said first resilient means.

13. The combination set forth in claim 12 in which the link pivoted to the free end of said piston rod has a portion thereof extending beyond said pivot, said extending end defining a strip finger, whereby when said trip finger is pressed, the associated link will pivot about its pivot in direction to move said central pivot out of longitudinal alignment with said two other pivots.

14. The combination set forth in claim 13 in which a solenoid is provided having a plunger normally spaced from said trip finger, and means to actuate said solenoid to extend said plunger to engage said trip finger.

15. The combination set forth in claim 1 in which the frame of said cart comprises a substantially horizontal lower base portion and an upper base portion vertically spaced from said lower base portion, said plurality of wheels being mounted on said lower base portion, said actuator being pivotally mounted at one end to one side of said upper base portion and extending toward the other side thereof, said locking bar having a substantially vertical portion, an actuating arm extending outwardly from the upper end of said vertical portion, said locking finger extending outwardly from the lower end of said vertical portion, said pivotal mount for said locking bar being located at said other side of said upper base portion and coacting with said locking bar at the junction of said vertical portion and the actuating arm, the free end of said actuating arm being pivotally connected to the free end of said piston rod.

16. The combination set forth in claim 15 in which means are provided coacting with said upper base portion and said actuating arm to rotate said locking bar in its pivotal mount to move said locking finger out of engagement with said wheel and to move said piston rod to extended position to stress said resilient means, said locking means being actuated when said piston rod is in extended position releasably to lock said piston rod in such position.

17. The combination set forth in claim 15 in which a pivot stud is secured to the upper base portion adjacent the other edge thereof and depends therefrom, a lever is provided having a handle portion with a hub at one end adapted to be rotatably mounted on said stud, an actuating bar portion extending outwardly from said hub, said bar portion having an upstanding finger at its free end adapted to be positioned inwardly of said actuating arm and movable thereagainst when said hub is rotated about said pivot by said handle, whereby movement of said actuating arm will retract said piston rod to move the latter to extended position, thereby stressing said resilient means and actuating said releasable locking means to lock said piston rod in retracted position and simultaneously pivoting said locking bar to move said locking finger out of engagement with said wheel.

18. The combination set forth in claim 15 in which said lower base portion comprises a pair of spaced elongated legs, said upper base portion also comprises a pair of spaced elongated legs rigidly secured to the first pair of legs, a pair of U-shaped brackets are secured respectively to the legs of said lower base portion near one end thereof, said plurality of wheels comprises a first pair rotatably mounted respectively in said brackets, and a second pair secured to said first pair of legs near the other end of said lower base portion, said actuator is pivotally mounted at one end to one of the legs of said upper base portion and extends laterally toward the other leg of said upper base portion, said pivotal mount for said locking bar being secured to said other leg of said upper base portion, said locking bar having a substantially vertical portion, an actuating arm extending outwardly from the upper end of said vertical portion, said locking finger extending transversely outwardly from the lower end of said vertical portion, said pivotal mount coacting with said locking bar at the junction of said vertical portion and the actuating arm, the free end of said actuating arm being pivotally connected to the free end of said piston rod, the lower end of said vertical portion extending through the cross piece of one of said brackets with said locking finger being adjacent said wheel.

19. The combination set forth in claim 15 in which a sleeve of resilient material encompasses said locking finger.

* * * * *